(12) United States Patent
Araki et al.

(10) Patent No.: US 6,671,167 B2
(45) Date of Patent: Dec. 30, 2003

(54) SOLID ELECTROLYTIC CAPACITOR, AND METHOD FOR PREPARING THE SAME

(75) Inventors: Kenji Araki, Toyama (JP); Osamu Funaya, Toyama (JP); Shinji Arai, Toyama (JP)

(73) Assignee: NEC Tokin Toyama, Ltd., Toyama (JP)

( * ) Notice: Subject to any disclaimer, the term of this patent is extended or adjusted under 35 U.S.C. 154(b) by 0 days.

(21) Appl. No.: 10/300,748

(22) Filed: Nov. 21, 2002

(65) Prior Publication Data

US 2003/0111247 A1 Jun. 19, 2003

(30) Foreign Application Priority Data

Nov. 26, 2001 (JP) ........................................ 2001-359779

(51) Int. Cl.[7] ................................................ H01G 4/06
(52) U.S. Cl. ........................................ 361/523; 361/524
(58) Field of Search ................................ 361/523, 524, 361/525, 528, 532; 29/25.03

(56) References Cited

U.S. PATENT DOCUMENTS 5,473,503 A * 12/1995 Sakata et al. ............... 361/525
5,621,608 A * 4/1997 Arai et al. .................. 361/525
6,212,064 B1 * 4/2001 Aoki et al. .................. 361/523
6,229,689 B1 * 5/2001 Kobayashi et al. ......... 361/525

FOREIGN PATENT DOCUMENTS

| JP | 2000-133551 A | 5/2000 |
|---|---|---|
| JP | 2000-191906 A | 7/2000 |
| JP | 2001-307958 A | 11/2001 |
| JP | 2002-015956 A | 1/2002 |

* cited by examiner

Primary Examiner—Anthony Dinkins
(74) Attorney, Agent, or Firm—Sughrue Mion, PLLC

(57) ABSTRACT

A solid electrolytic capacitor is disclosed which combines low LC with Low ESR and which has good characteristics even in a high frequency range, and a method for preparing the same is also disclosed. In the solid electrolytic capacitor whose electrolyte layer contains electrically conductive particles, non-conductive particles are present in at least a part of an interface between a dielectric layer and the electrolyte layer. By employing the structure, local intensifications of field strength in the dielectric layer are prevented to enable a problem of increase in LC to be overcome while keeping ESR low. By the method which comprised a step of applying a colloidal dispersion containing the non-conductive particles in the form of colloidal particles to the post-electrolytic layer formation step product, the solid electrolytic capacitor having the above-mentioned structure can be prepared efficiently.

7 Claims, 5 Drawing Sheets

SOLID ELECTROLYTIC CAPACITOR, AND METHOD FOR PREPARING THE SAME

BACKGROUND OF THE INVENTION

1. Field of the Invention

The present invention relates to a solid electrolytic capacitor and a method for preparing the same.

2. Description of the Prior Art

Heretofore, a solid electrolytic capacitor has comprised an anode, a dielectric layer, an electrolyte layer, and a cathode. Generally, a solid electrolytic capacitor has had a structure comprising an anode made of a metal exhibiting valve action (valve metal), an oxidized layer as a dielectric layer formed over the surface of the anode, an electrolyte layer as a semiconductor layer formed on the dielectric layer, and a cathode (made of graphite or the like) formed on the electrolyte layer.

In this connection, the valve metal means a metal capable of forming an oxidized layer whose thickness can be controlled by anodic oxidation. Specifically, valve metal includes niobium. (Nb), aluminum (Al), tantalum (Ta), titanium (Ti), hafnium (Hf) and zirconium (Zr). Actually, however, aluminum and tantalum are mainly used.

With respect to aluminum (Al), a foil is generally used as the anode, and with respect to Ta, a porous body prepared by sintering a Ta-based powder is used as the anode.

Of those solid electrolytic capacitors, a solid electrolytic capacitor having a porous sintered body type is particularly adaptable to miniaturization and capable of being adapted to have a high capacity, and hence there is strong demand therefor as a part which meets needs of miniaturization of a cellular phone, information terminal equipment or the like.

In the following, a structure and a preparation method of a conventional Ta solid electrolytic capacitor will be described with reference to the drawings.

FIG. 4 is a sectional view showing a structure of a conventional Ta solid electrolytic capacitor.

As shown in FIG. 4, the conventional solid electrolytic capacitor 1 using Ta comprises an anode body 11 which is provided with an element lead wire 11a implanted therein and which Is formed by sintering a Ta-based mixed powder, a dielectric layer 12 formed over the surface of the anode body 11, an electrically conductive polymer layer as an electrolyte layer 13 which is formed on the surface of the dielectric layer 12, a graphite paste layer 14 as a cathode body which is formed on the electrolyte layer 13 as a semiconductor layer, and a silver (Ag)-containing paste layer 15 formed on the cathode body 14.

To the element lead wire 11a of the anode body 11 and the silver (Ag)-containing paste layer 15, lead frames 52 are connected, respectively. The resultant is sheathed with a resin by molding with end portions of the lead frames 52 out.

In the next place, a method for preparing a conventional Ta solid electrolytic capacitor will be described with reference to FIG. 5.

FIG. 5 is a flow chart showing a method for preparing a conventional solid electrolytic capacitor.

(1) Formation of Ta Porous Body (S 1)

(i) Preparation of Ta-based Powder

To improve press-moldability, a binder is added to a Ta powder, and the addition is followed by mixing.

(ii) Press Molding and Sintering

An element lead wire for an anode is partially inserted in the Ta-based powder, and the resultant was press-molded into a cylindrical or parallelepipedonal shape Then, the press-molded product is sintered by heating at a temperature of 1,300degreeC. to 2,000degreeC. under high vacuum ($10^{-4}$ Pa or lower pressure) to form a Ta porous body, i.e., an anode body.

(2) Formation of Dielectric Layer (S 2)

Chemical Conversion Treatment (S 2a)

The Ta porous body as an anode was soaked in an electrolytic aqueous solution such as a phosphoric acid aqueous solution together with a counter electrode, and a chemical conversion voltage (formation voltage) is applied to thereby form an oxidized Ta layer as a dielectric layer over the surface of the Ta porous body. (anodic oxidation method)

The thickness of the dielectric layer (oxidized Ta layer) is dependent upon the chemical conversion voltage (Vf: formation voltage) when an electric current is fixed, and characteristics as a capacitor are in turn dependent upon the thickness of the oxidized Ta layer. As the electrolytic solution, there may be used an aqueous solution of phosphoric acid of which concentration is adjusted to 0.6%, or the like.

(3) Formation of Electrolyte Layer (S 3)

On the oxidized layer formed over the Ta porous body in the preceding step, a solid electrolyte layer is formed. (S 3a)

As the solid electrolyte, there may be used manganese dioxide, or an electrically conductive polymer obtained by polymerizing a monomeric material such as pyrrole, thiophene or a derivative thereof.

For example, when a pyrrole polymer is used as the solid electrolyte, a solid electrolyte layer is formed on the dielectric layer formed over the surface of the anode body by effecting chemical polymerization or electrolytic polymerization using a pyrrole monomer solution and a solution of an oxidizing agent such as iron trichloride, as disclosed in Japanese Unexamined Patent Publication No.2001-160318 by Fukunaga et al.

For forming the electrically conductive polymer, a process may be employed which comprises preliminarily applying an oxidizing agent to the surface of the dielectric layer, and then soaking the resultant in a monomer solution to effect polymerization reaction, as disclosed in Japanese Unexamined Patent Publication No.2000-216061 by one of the present inventors.

(4) Re-Treatment for Chemical Conversion (S 4)

In the step of forming the solid electrolyte layer, the dielectric layer is likely to be damaged. To mend the damaged portions of the dielectric layer, the anode body with the sequentially formed dielectric and solid electrolyte layers is subjected again to the chemical conversion treatment.

(5) Formation of Cathode Body (S 5)

Formation of Graphite Paste Layer (S 5a), and Formation of Silver (Ag)-Containing Paste Layer (S 6)

A graphite layer as a cathode layer is formed on the solid electrolyte layer, and a silver (Ag)-containing paste layer is formed thereon. With respect to the formation of the graphite layer, a method disclosed in Japanese Unexamined Patent Publication NC. 1999-297574 by one of the present inventors may be employed.

(6) Connection of Lead Frames (S 7), and Sheathing by Molding (S 8)

Then, a lead frame for the anode is connected to the element lead wire of the anode body by spot welding, and a lead frame for the cathode is connected to the silver (Ag)-containing paste layer with an electrically conductive adhesive.

Finally, the resulting capacitor element is sheathed with a resin by molding with end portions of the lead frames out to complete a Ta solid electrolytic capacitor having a structure as shown in FIG. 4.

However, the Ta solid electrolytic capacitor prepared through the above-described steps has problems which affect basic characteristics thereof, i.e., formation of so-called defective portions and lowering of electrical conductivity of the electrolyte layer.

In the first place, description will be given with respect to the defective portions of the dielectric layer.

The defective portions of the dielectric layer mean portions where the dielectric layer has insufficient thicknesses, and specifically, mean locally concave areas where the dielectric layer has smaller thicknesses such as cracks or concave areas having thicknesses smaller than the intended thickness of the dielectric layer such as portions which have undergone exfoliation of the dielectric layer.

Causes of the formation of defective areas include (A) inclusion of impurities in Ta, (B) irregularity of current in the chemical conversion step and (C) external mechanical stress, and it is believed that any of these causes cannot completely be prevented from occurring in the existing methods for preparing a solid electrolytic capacitor.

Since thicknesses of the dielectric layer in the defective portions are smaller than that in the other area, local intensifications of field strength are likely to occur in such defective portions. Locally elevated temperatures caused by the local intensifications of field strength rise to crystallizations of the dielectric layer to result in dielectric breakdowns of the dielectric layer. (The term "local intensifications of field strength" used herein means a phenomenon that electric field strength is locally intensified.)

Such dielectric breakdowns make one of the causes of increase in leakage current (hereinafter referred to as LC).

In the conventional technique, the step of re-treatment for chemical conversion is employed as means for repairing the defective portions of the dielectric layer. However, the step of re-treatment for chemical conversion is insufficient as means for repairing the dielectric layer. For example, the step does not rake measures to solve the above-mentioned cause (A). This is because if a metal which does not exhibit valve action, for example, a metal more noble than tantalum is present on the surface of the anode body as an impurity, no substantial dielectric layer is formed over the metal present on the surface of the anode body.

In the next place, description will be given with respect to the lowering of electrical conductivity of the electrolyte layer.

The electrolyte layer of the conventional solid electrolytic capacitor prepared by the above-described conventional preparation method comprises an electrically conductive polymer in the form of deposited clusters. Contact resistances at contacts between the clusters and contacts between the clusters and the cathode body cause increase of equivalent series resistance (hereinafter referred to as ESR). A capacitor having high ESR has a drawback that its characteristics in a high frequency range are poor.

To cope therewith, electrically conductive particles are incorporated at an appropriate density so as to diminish the contacts mentioned above to reduce contact resistances in the electrolyte layer. Hence, and the electrolyte layer is thereby improved in its function as a semiconductor layer to obtain a solid electrolytic capacitor having low ESR, as disclosed in JP-P-2001-307958A and JP-P-2002-15956A by Mitsui et al., JP-P-2000-133551A by Hoshino et al., and JP-P-2000-191906A by Yoshilawa et al.

The electrically conductive particles are only required to be present between the clusters and in the interface between the clusters and the cathode body. The electrically conductive particles may be present in the electrically conductive polymer clusters.

The electrically conductive particles preferably have sizes in a range of about 1 $\mu$m to about 1000 $\mu$m which enables effectively improving electrical conductivity of the electrolyte layer.

The electrically conductive particles may be made of the same material as constitutes the cathode body formed on the electrolyte layer. The electrically conductive particles may be made of one selected from the electrically conductive materials such as a powder of $SnO_2$ or $ZnO$, inorganic particles of $TiO_2$, $BaSO_4$ or the like which have the above-listed powder thereon and thereby rendered electrically conductive, an electrically conductive carbonaceous filler such as carbon black, particulate graphite or fine carbon fiber, and a powder of an electrically conductive obtained by polymerizing a monomeric material such as pyrrole, thiophene or a derivative thereof.

In the above-described prior art also, the electrically conductive particles are placed between the cathode body and dielectric layer with a view to lowering ESR.

However, there is an upper limit with respect to the density of the electrically conductive particles which allows the electrolyte layer to effectively function as a semiconductor layer. In other words, incorporation of the electrically conductive particles in an excess amount causes deterioration of basic characteristics of the capacitor, in particular, increase of LC.

Accordingly, the electrically conductive particles are generally incorporated in a controlled amount within a range predetermined on the supposition that the electrically conductive particles are uniformly dispersed.

In reality, however, even if the electrically conductive particles are incorporated in an amount estimated to be effective, increase of LC can be caused.

This is because the electrically conductive particles can be distributed non-uniformly due to thermal expansion, heat contraction or the like caused in the steps of the preparation of the solid electrolytic capacitor, in particular, the step of molding a resin or the step of welding to form areas where the electrically conductive particles are distributed locally at high densities on the surface of the dielectric layer. In such areas, local intensifications of field strength are likely to occur to cause increase of LC.

Further, even if the electrically conductive particles are incorporated in an appropriate amount and therefore the electrically conductive particles are distributed at moderate densities, increase of LC is able to occur. In a case where the electrically conductive particles are present between the defective portions of the dielectric layer and the electrically conductive polymer, local intensifications of field strength occurs to cause increase of LC consequently.

In the conventional techniques, the electrically conductive particles are incorporated in the electrolyte layer focusing attention only on lowering ESR, and as opposed to the present invention, no attention is paid to the disadvantage attendant on the incorporation of the electrically conductive particles. Accordingly, studies have not been made from the viewpoint to realize compatibility between low ESR and low LC.

SUMMARY OF THE INVENTION

It is the primary object of the present invention to provide a solid electrolytic capacitor which is capable of solving the above-mentioned problems and realizing compatibility of low LC with low ESR, and a method for preparing the same.

Specifically, the object of the present invention is to provide a solid electrolytic capacitor which is not susceptible to dielectric breakdown of a dielectric layer, and a method for preparing the same.

According to an embodiment of the present invention, there is provided a solid electrolytic capacitor comprising:

an anode body;

a dielectric layer formed over the surface of the anode body;

non-conductive particles placed on at least a part or the dielectric layer;

an electrolyte layer formed on the dielectric layer with the non-conductive particles placed thereon, said electrolyte layer including an electrically conductive polymer and electrically conductive particles; and a cathode body formed on the electrolyte layer.

In the solid electrolytic capacitor having the constitution, dielectric breakdowns of the dielectric layer are prevented to a large extent to diminish possibility of increase of LC, and compatibility of low LC with low ESR is thereby realized.

According to another embodiment of the present invention, there is provided a method for preparing a solid electrolytic capacitor, said method comprising steps of:

(A) forming a dielectric layer over a surface of an anode body;

(B) forming an electrolyte layer including electrically particles on the dielectric layer;

(C) applying a colloidal dispersion containing non-conductive colloidal particles to the product resulting from the step (B), followed by drying the resultant to place the non-conductive particles in at least a part of the interface between the dielectric layer and the electrolyte layer; and (D) forming a cathode body on the electrolyte layer.

By employing the method, the non-conductive particles are effectively placed in the interface between the dielectric layer and the electrolyte layer to realize low LC, thereby contributing to improvement of characteristics of the capacitor. Accordingly, proportion defective in the preparation is lowered to lead to improvement in yield of the solid electrolytic capacitor.

BRIEF DESCRIPTION OF THE DRAWINGS

The above-mentioned objects and other objects, embodiments and effects of the present invention will be more apparent by the following description with reference to the drawings.

DETAILED DESCRIPTION OF THE PREFERRED EMBODIMENTS

In the following, an embodiment of the solid electrolytic capacitor according to the present invention and an embodiment of the method for preparing the same will be described with reference to the drawings.

Figure 1:
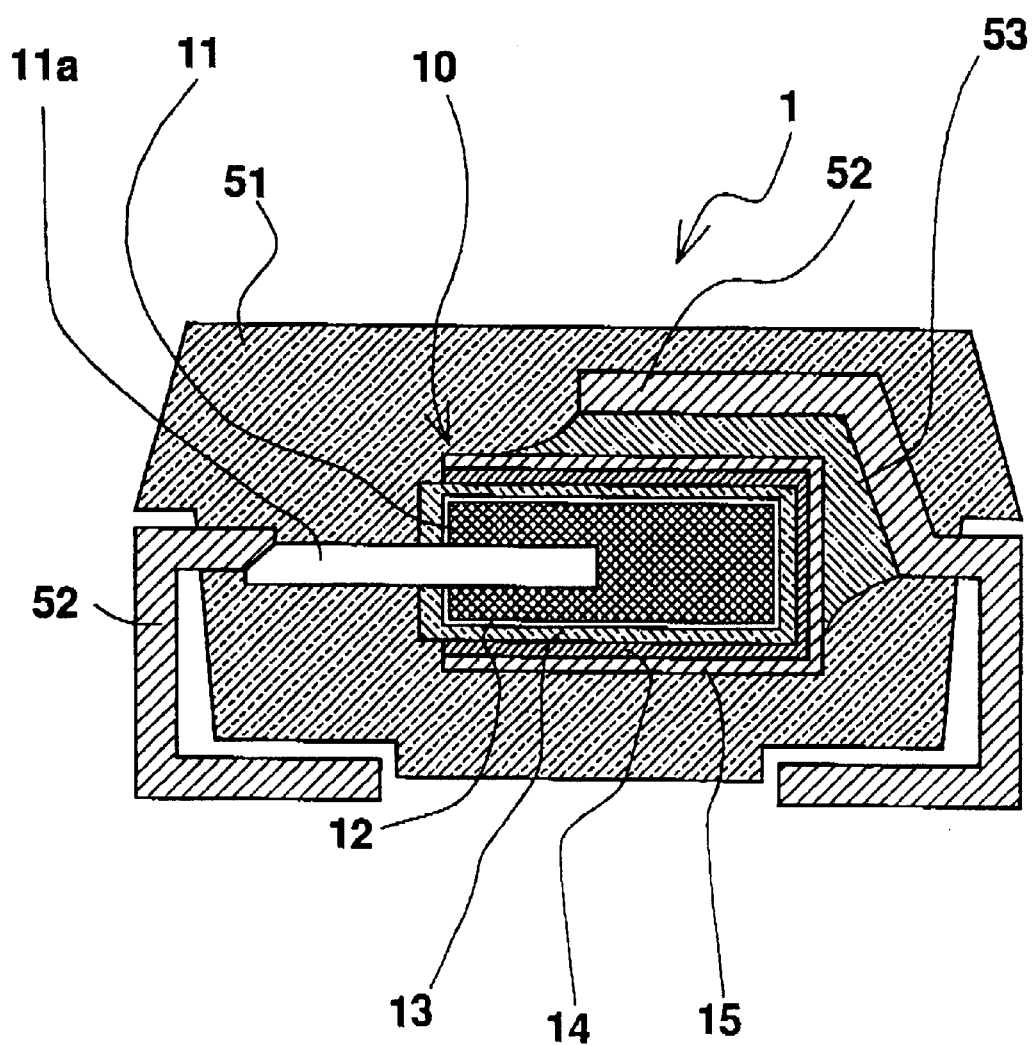
FIG. 1 is a sectional view schematically showing a constitution of an embodiment of the solid electrolytic capacitor according to the present invention.

FIG. 1 is a sectional view schematically showing a structure of the embodiment of the solid electrolytic capacitor according to the present invention.

As shown in FIG. 1, the embodiment of the solid electrolytic capacitor 1 according to the present invention comprises a capacitor element 10, lead frames 52 to which an anode section and a cathode section of the capacitor element are directly and indirectly connected, respectively, and a molded resin 51 which seals at least the capacitor element 10.

The capacitor element 10 as a constituent of the solid electrolytic capacitor 1 comprises an element lead wire 11a made of Ta, an anode body 11 with the element lead wire 11a implanted therein which anode body is prepared by sintering a Ta-based mixed powder, a dielectric layer 12 formed over the surface of the anode body 11, an electrolyte layer 13 formed on the surface of the dielectric layer 12 and including an electrically conductive polymer 131 and graphite particles 141 as electrically conductive particles, a cathode body 14 consisting of a graphite paste layer 141 so formed as to surround the electrolyte layer 13, and a silver (Ag)-containing paste layer 15 formed on the cathode body 14.

The above-mentioned anode section means the element lead wire 11a which has been inserted in the anode body 11 when the anode body has been formed. On the surface of the element lead wire 11a, the dielectric layer 12 is not formed so as to permit conduction between the element lead wire 11a and the lead frame 52 to which the element lead wire 11a is connected.

The above-mentioned cathode section, which is the silver (Ag)-containing paste layer 15 in this embodiment, means or the outermost layer to which the lead frame 52 is connected and which is in conduction with the cathode body 14 of the capacitor element 10.

The lead frames 52 are an anode terminal and a cathode terminal which are connected to the element lead wire 11a as the anode section and the silver (Ag)-containing paste layer 15 as the cathode section, respectively.

In this embodiment, the lead frame 52 as the cathode terminal and the silver (Ag)-containing paste layer 15 are connected via an electrically conductive adhesive 53.

Subsequently, the structure of the embodiment of the solid electrolytic capacitor according to the present invention and, in particular, the structure of the above-described capacitor element 10 will be described below with reference to FIG. 2.

Figure 2:
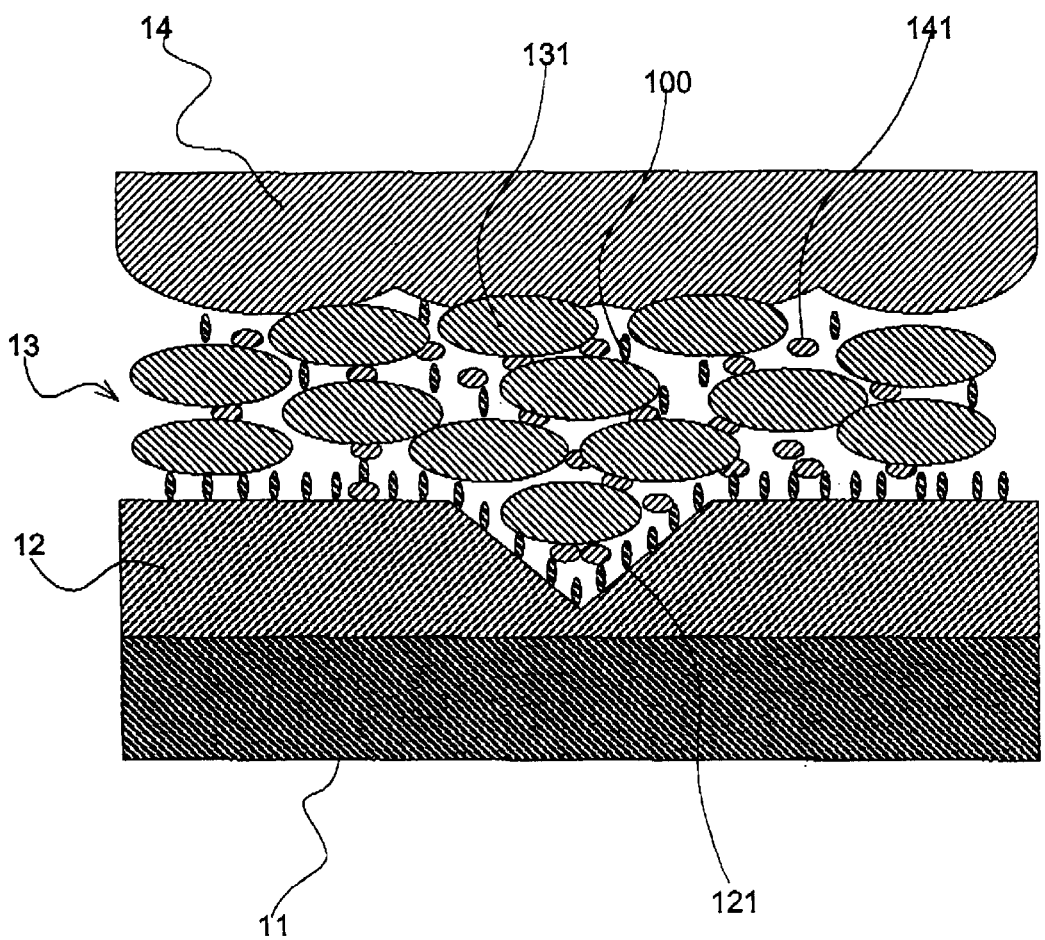
FIG. 2 is a partial enlarged sectional view schematically showing a structure of a characteristic portion of the embodiment of the solid electrolytic capacitor according to the present invention.

FIG. 2 is a partial enlarged sectional view schematically showing a structure of a characteristic portion of the capacitor element 10 of the solid electrolytic capacitor according to the present invention.

As shown in FIG. 2, the capacitor element 10 of the solid electrolytic capacitor according to the present invention comprises an anode body 11 made of a sintered product having a large number of irregularities in its surface and interior, a dielectric layer 12 formed over the surface of the anode body 11, an electrolyte layer 13 formed on the dielectric layer 12, a cathode body 14 (graphite paste layer 141) so formed as to surround the electrolyte layer 13, and a silver (Ag)-containing paste layer 15 formed on the cathode layer 14.

The electrolyte layer 13 comprises an electrically conductive polymer 131 in the form of clusters and graphite particles 141 as electrically conductive particles. The electrically conductive polymer clusters 131 are irregularly deposited in large numbers, and some of the graphite particles 141 are present in voids among the deposited electrically conductive polymer clusters 131 and between the electrolyte layer 13 and the dielectric layer 12.

The graphite particles 141 are electrically conductive particles for improving ESR characteristics of the solid electrolytic capacitor. The electrically conductive particles preferably have sizes in a range of about 1 $\mu$m to about 1,000 $\mu$m which enables effectively improving ESR characteristic of the solid electrolytic capacitor. If the size is smaller than about 1 $\mu$m, improvement in initial ESR characteristics is likely to be insufficient. If the size exceeds about 1,000 $\mu$m, deterioration of ESR characteristics becomes non-negligible in use for a long period of time.

Further, non-conductive particles 100 are present at least on a part of the surface of the dielectric layer 12. In other words, the non-conductive particles 100 are present at least in a part of interface between the dielectric layer 12 and the electrolyte layer 13 including an electrically conductive polymer 131 and electrically conductive particles.

Accordingly, the solid electrolytic capacitor according to the present invention comprises an anode body 11, a dielectric layer 12 formed over the surface of the anode body 11, non-conductive particles 100 placed on at least a part of the dielectric layer 12, an electrolyte layer 13 including an electrically conductive polymer 131 and electrically conductive particles (for example, graphite particles 141) and formed on the dielectric layer 12 with the non-conductive particles 100 placed thereon, and a cathode body 14 formed on the electrolyte layer 13.

The presence of the non-conductive particles 100 between the electrolyte layer 13 and the dielectric layer 12 prevents direct contact between the electrolyte layer 13 and the dielectric layer 12. Accordingly, even it thermal expansion or heat contraction is inevitably caused in the preparation of the solid electrolytic capacitor, local intensifications of field strength in the dielectric layer and dielectric breakdowns which are attributable thereto are less likely to occur. Thus the solid electrolytic capacitor comprising such a structure has a low LC value as well as a low ESR value and has good characteristics even in a high frequency range.

The non-conductive particles 100 may be placed in the interface between the electrically conductive particles (graphite particles 141) present on the dielectric layer 12 and the electrically conductive polymer (clusters) 131 or electrically conductive particles (graphite particles 141) of the electrolyte layer 13. In this case also, direct contact (area) between the electrolyte layer 13 and the dielectric layer 12 is prevented. Accordingly, local intensifications of field strength in the dielectric layer and dielectric breakdowns which are attributable thereto are less likely to occur.

It is preferred that the non-conductive particles 100 be present on surfaces of so-called defective portions of the dielectric layer 12, for example, concave areas (121) such as cracks or continuous areas having thicknesses smaller than the intended thickness of the dielectric layer 12 such as portions which have undergone exfoliation in the interface between the dielectric layer 12 and the electrolyte layer 13.

In such areas, since the dielectric layer have thicknesses smaller than chat in the other area, local intensifications of field strength are likely to occur. However, the presence of the non-conductive particles 100 between the defective portions in the surface of the dielectric layer 12 and the electrolyte layer 13 diminishes possibility of occurrence of local intensifications of field strength. Accordingly, increase in LC value is substantially prevented to enable a solid electrolytic capacitor having a low LC value and a low ESR value to be realized.

Further, it is preferred that non-conductive particles 100 present on surfaces of defective portions of the dielectric layer 12 be in contact with the electrically conductive particles (the graphite particles 141 in this embodiment) of the electrolyte layer 13. This is because if graphite particles 141 are in direct contact with the dielectric layer 12 in the areas where local intensifications of field strength are likely to occur, possibility of occurrence of dielectric breakdown is high.

Accordingly, by virtue of the presence of the non-conductive particles 100 in the interface between the dielectric layer 12 and the graphite particles 141 in the defective portions of the dielectric layer 12, possibility of increase in LC value is particularly lowered to enable a solid electrolytic capacitor having a low LC value and low ESR to be realized.

In this embodiment, graphite particles 141 which are made of the same material as the cathode body 14 are used as the electrically conductive particles for the convenience of production process control. Accordingly, the electrically conductive particles used in the present invention are not restricted to those made of the same material as the cathode body.

As a material of the non-conductive particles, there may be used silica, titanium oxide, silicon carbide or the like.

In the next place, an embodiment of the method for preparing the solid electrolytic capacitor according to the present invention will be described below with reference to the drawings.

In the description with respect to the embodiment of the method for preparing the solid electrolytic capacitor according to the present invention, each of concentrations of solutions or dispersions which is expressed in percentage means % by volume unless otherwise specified.

Figure 3:
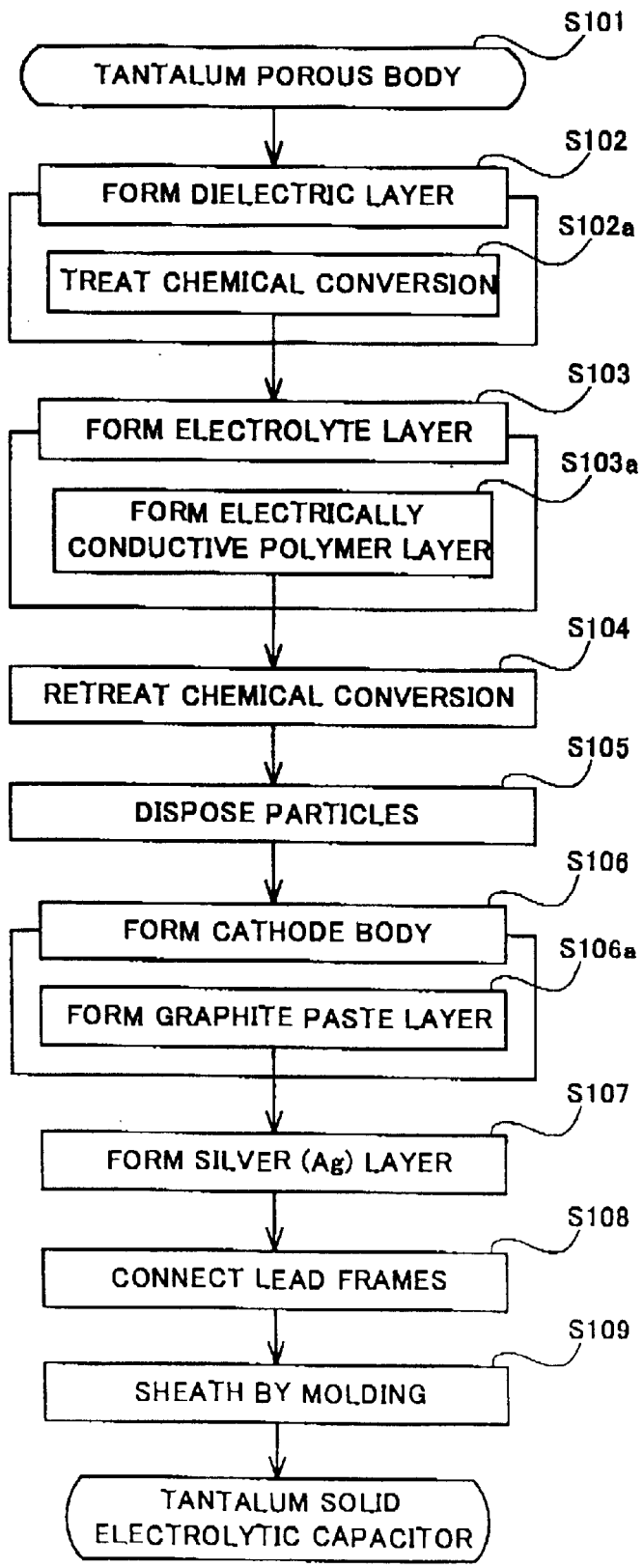
FIG. 3 is a flow chart showing a main part of an embodiment of the method for preparing a solid electrolytic capacitor according to the present invention.
Figure 4:
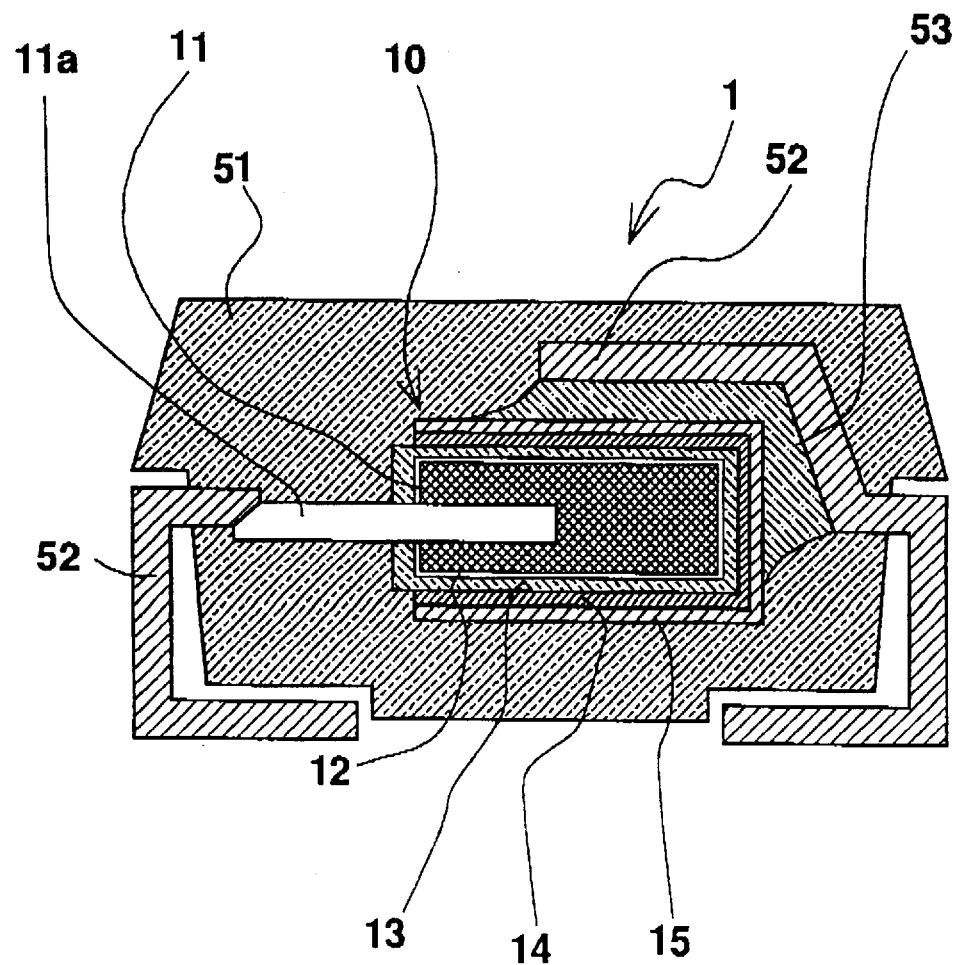
FIG. 4 is a sectional view showing a structure of a conventional solid electrolytic capacitor.
Figure 5:
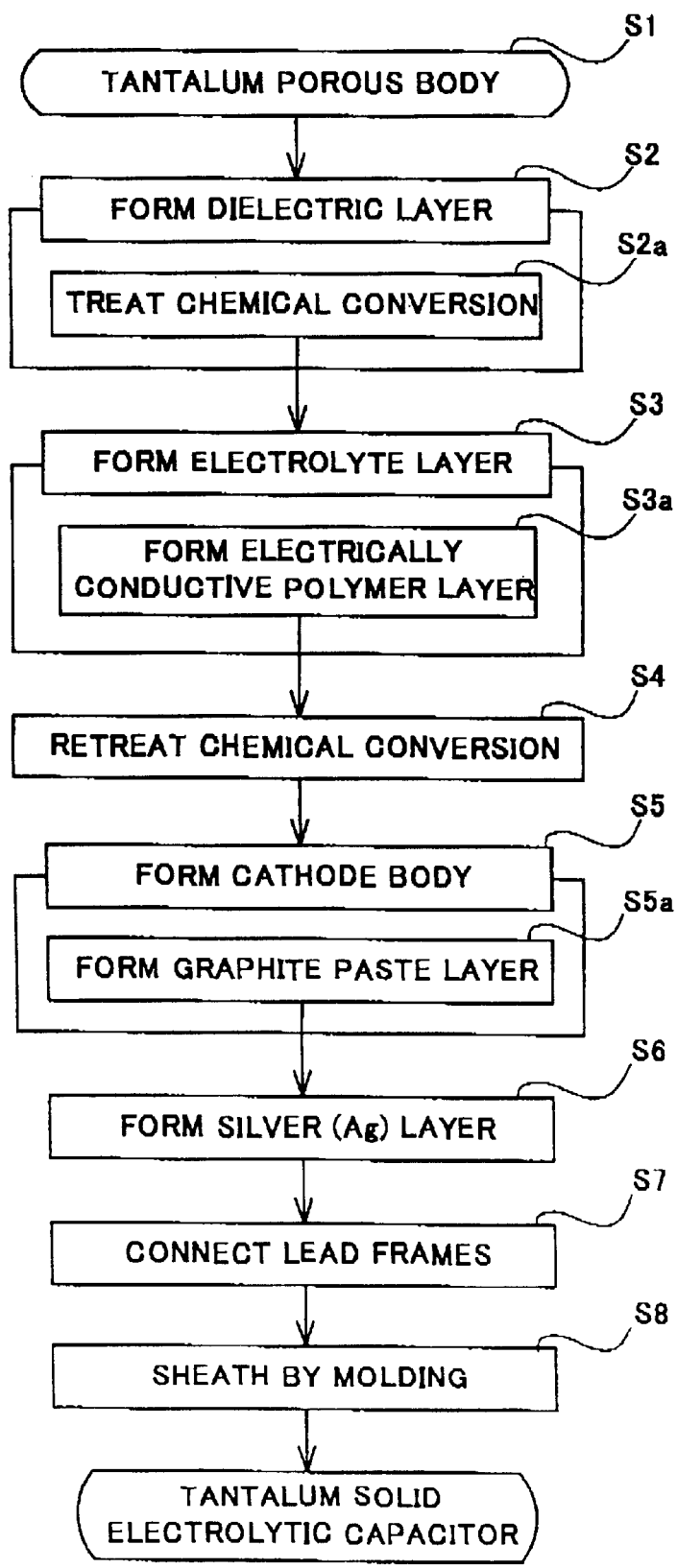
FIG. 5 is a flow chart showing a main part of a method for preparing the conventional solid electrolytic capacitor.

FIG. 3 is a flow chart showing the embodiment of the method for preparing the solid electrolytic capacitor according to the present invention.

As shown in FIG. 3, (1) Formation of Ta Porous Body (Anode Body) (S 101)

(i) Preparation of Ta-based Powder

To improve press-moldability, a binder is added to a Ta powder, and the addition is followed by mixing.

(ii) Press Molding and Sintering

An element lead wire for an anode is partially inserted in the Ta-based powder, and the resultant is press-molded into a cylindrical or parallelepipedonal shape.

Then, the press-molded product is sintered by heating at a temperature of 1,300degreeC. to 2,000degreeC. under high vacuum ($10^{-4}$ Pa or lower pressure) to form a Ta porous body, which is an anode body.

(2) Formation of Dielectric Layer (S 102)

(Chemical Conversion Treatment (S 102a))

The Ta porous body as an anode is soaked in an electrolytic aqueous solution such as an aqueous solution of phosphoric acid, boric acid, sulfuric acid or oxalic acid together with a counter electrode, and a chemical conversion voltage (formation voltage) is applied to thereby form an oxidized Ta layer as a dielectric layer over the surface of the Ta porous body. (anodic oxidation method)

The thickness of the oxidized Ta layer is dependent upon the chemical conversion voltage (Vf: formation voltage) on the condition that an electric current is kept constant during the Treatment, and characteristics as a capacitor are in turn dependent upon the thickness of the oxidized Ta layer. As the electrolytic solution, there may be used an aqueous solution of phosphoric acid of which concentration is adjusted to 0.6%, or the like.

(3) Formation of Electrolyte Layer (S 103)

The electrolyte layer 13 according to the present invention comprises an electrically conductive polymer 131 and electrically conductive particles such as graphite particles 141.

Formation of Electrically Conductive Polymer Layer (S 103a)

For formation of the electrolyte, an electrically conductive polymer is used.

As the electrically conductive polymer, there may be used an electrically conductive polymer obtained by polymerizing a monomeric material such as pyrrole, thiophene, aniline, furan or a derivative thereof.

The formation of the electrically conductive polymer is effected, for example, by carrying out chemical oxidative polymerization. First, an oxidizing agent-containing solution is prepared by dissolving an oxidizing agent such as ferric benzenesulfonate, ferric toluenesulfonate, ferric naphthalenesulfonate or iron trichloride in a mixed solvent of water and an alcohol such as ethyl alcohol, methyl alcohol, propyl alcohol or the like. The anode body provided with the dielectric layer is soaked in the oxidizing agent-containing solution and then dried, and the resultant is then soaked in a solution of the monomeric material for forming the electrically conductive polymer.

In this embodiment of the present invention, the monomeric material in the solution thereof in which the electrically conductive particles are dispersed is polymerized to form the electrolyte layer comprising the electrically conductive polymer clusters with electrically conductive particles scattered therebetween. By the incorporation of the electrically conductive particles, electrical conductivity of the electrically conductive polymer can be improved to lead to improved function of the electrically conductive polymer as a semiconductor. As representative materials of the electrically conductive particles, there may be mentioned a powder of $SnO_2$ or ZnO, inorganic particles of $TiO_2$, $BaSO_4$ or the like which have the above-listed powder thereon and thereby rendered electrically conductive, an electrically conductive carbonaceous filler such as carbon black, particulate graphite or fine carbon fiber, and a powder of an electrically conductive polymer obtained by polymerizing a monomeric material such as pyrrole, thiophene or a derivative thereof.

In this embodiment, graphite particles which are made of the same material as the cathode body are used as the electrically conductive particles for the convenience of production process control. Accordingly, the electrically conductive particles used in the present invention are not restricted to those made of the same material as the cathode body.

The electrically conductive particles preferably have sizes in a range of about 1 $\mu$m to about 1,000 $\mu$m which enables effectively improving ESR characteristics of the solid electrolytic capacitor. If the size is smaller than about 1 $\mu$m, improvement in initial ESR characteristics is insufficient. If the size exceeds about 1,000 $\mu$m, deterioration of ESR characteristics becomes non-negligible in use for a long period of time.

In this preparation method, it is preferred that the electrically conductive particles be incorporated in an amount of 4,000 parts by weight or less relative to 100 parts by weight of the electrically conductive polymer. If the amount exceeds 4,000 parts by weight, viscosity of the solution for forming the electrolyte layer is increased to cause unevenness in application. A solid electrolytic capacitor having such unevenness in application is likely to have a high LC value and a high ESR value.)

(4) Re-Treatment for Chemical conversion (S 104)

Subsequently, with a view to re-conditioning the dielectric layer, procedure as the above-described chemical conversion treatment (S 102a) is performed again, except that the post-S 103 product is soaked in the electrolytic solution instead of the Ta porous body.

(5) Placement of Non-Conductive Particles (S 105)

In a procedure for placing (depositing) the non-conductive particles on the dielectric layer, first, non-conductive particles are preliminarily prepared as colloidal particles and dispersed in a dispersion medium to prepare a colloidal dispersion.

As examples of the combination of the particles and the dispersion medium, there may be mentioned those disclosed in Japanese Unexamined Patent Publication No.1992-311020 by Sakaguchi et al.

In this embodiment, as a material of the non-conductive particles, for example, silica, titanium oxide or silicon carbide is used from the viewpoint of stable availability of the material. There is no particular restriction with respect to the shape of the non-conductive particles. With respect to the sizes thereof, however, the non-conductive particles preferably have an average diameter smaller than that of the electrically conductive particles (graphite particles in this embodiment) included in the electrolyte layer. This facilitates efficient placement of the non-conductive particles between the electrically conductive particles and the dielectric layer.

As the dispersion medium, water is used from such a viewpoint that water has less interaction with the electrically conductive polymer used in the electrolyte layer than other dispersion media.

Since the colloidal particles are uniformly dispersed in the colloidal dispersion, the colloidal particles reach the interface between the dielectric layer and the electrolyte layer through the fine voids in the electrolyte layer together with the water as the dispersion medium. In this connection, sizes of the fine voids in the electrolyte layer are generally in a range of about 1 $\mu$m to about 1,000 $\mu$m, although the sizes vary depending upon the conditions in the Step S 103 such as the selected material. Accordingly, since the non-conductive particles in the form of colloidal particles have sizes sufficiently smaller than those of the voids in the electrolyte layer, the non-conductive particles easily reach the interface between the dielectric layer and the electrolyte layer through the fine voids in the electrolyte layer.

Preferably, the colloidal dispersion contains the colloidal particles in a concentration of about 0.1% by weight to about 0.5% by weight. If the concentration is lower than about 0.1% by weight, the non-conductive particles are placed in the interface between the dielectric layer and the electrolyte layer in a low density, so that function to prevent local intensifications of field strength is likely to be insufficient. If the concentration is higher than about 0.5% by weight, the viscosity of the colloidal dispersion becomes high, so that it becomes difficult to place the non-conductive particles in the interface between the dielectric layer and the electrolyte layer.

In the colloidal dispersion prepared in the above-described manner, the product which has been subjected to the step of re-treatment for chemical conversion is soaked to allow the colloidal dispersion containing the non-conductive colloidal particles to be present in the interface between the dielectric layer and the electrolyte layer. In this step, the non-conductive colloidal particles dispersed in the dispersion medium enter the voids in the electrolytic layer and the above-mentioned defective portions.

Subsequently, the product is taken out of the colloidal dispersion and dried to vaporize the dispersion medium. Preferably, the drying is carried out at a temperature as high as possible so long as it is allowable in terms of material characteristics. Generally, the drying is carried out, however, at a temperature of 100degreeC. to 150degreeC.

(6) Formation of Cathode Body (S 106)

Formation of Graphite Layer (S 106a)

Then, a cathode body made of graphite is so formed as to surround the electrolyte layer 13.

(7) Formation of Silver (Ag)-Containing Paste Layer (S 107)

Thereafter, a silver (Ag)-containing paste layer is formed on the cathode body to improve connection between the cathode body and a cathode terminal.

(8) Connection of Lead Frames (S 108)

Then, a lead frame for the anode is connected to the element lead wire of the anode body by spot welding, and a lead frame for the cathode is connected to the silver (Ag)-containing paste layer with an electrically conductive adhesive.

(9) Sheathing by Molding (S 109)

Finally, the resulting capacitor element is sheathed with a resin by molding with end portions of the lead frames out to complete a Ta solid electrolytic capacitor having a structure as shown in FIG. 1.

EXAMPLE

The description of the following specific Example is given by way of illustration for more clear understanding of the present invention. In Example, preferred embodiment of the present invention is described. It is, however, to be understood that the scope of the present invention is by no means restricted to the specific example.

In the following, an example of the solid electrolytic capacitor and the method for preparing the same according to the present invention will be described with reference to a Table.

Example 1

A tantalum powder in which an element lead wire made of tantalum is partially inserted and which has a CV value of 50 kcv/g was charged into a pelleter and pressed, the pressed product was sintered at a temperature of 1,350degreeC. in a vacuum atmosphere of $10^{-4}$ Pa or higher vacuum to obtain a porous anode body having a parallel-epipedonal shape.

The anode body was soaked in an aqueous solution of 0.6% by volume phosphoric acid and subjected to anodic oxidation with application of a voltage of 33.7 volt for 180 minutes to thereby form a dielectric layer having a large number of pores.

The resulting pellet was soaked in an oxidizing agent solution prepared by dissolving 400 g of ferric benzenesulfonate in 1000 g of an alcohol at room temperature for 5 minutes, and then dried.

Subsequently, the resulting pellet was soaked in an aqueous solution which contained 5% by weight of graphite particles having an average diameter of $1.0 \times 10^{-5}$ m and 5 to 7% by volume of pyrrole as a monomeric material for 1 minute and then air-dried. The soaking in the oxidizing agent solution and the drying subsequent thereto, and the soaking in the monomer-containing solution and the drying subsequent thereto were repeated 4 times to thereby form an electrolyte layer. The electrolyte layer had therein a large number of voids, and the voids had an average diameter of $1.0 \times 10^{-6}$ m to $1.0 \times 10^{-4}$ m.

Then, anodic oxidation treatment was performed again in the same manner as described above except that the pellet provided with the electrolyte layer was soaked instead of the porous anode body as such to effect re-conditioning of the dielectric layer.

Subsequently, an aqueous colloidal dispersion was prepared which contained 0.7% by weight of silica particles having an average diameter of about $1.0 \times 10^{-8}$ m and dispersed in water, and the pellet which had been subjected to the step of repairing the dielectric layer was soaked in the aqueous colloidal dispersion for 1 minute and then dried at a temperature of 120degreeC. for 30 minutes to dry water.

Thereafter, the resultant was soaked in a graphite paste obtained by mixing 5% by weight of a binder prepared by mixing a polymethyl methacrylate resin and an acetylcellulose at a weight ratio of 4:1, 15% by weight of a graphite powder, and 80% by weight of pure water. The soaking was repeated several times so as to apply the graphite paste in a thickness of 30 μm. Subsequently, the applied graphite paste was cured at a high temperature of 150degreeC. for 30 minutes to form a graphite paste layer as a cathode body.

Then, a silver (Ag)-containing paste layer was formed on the cathode body. A lead frame for the anode body was connected to the element lead wire of the anode body by spot welding, and a lead frame for the cathode body was connected to the silver (Ag)-containing paste layer with an electrically conductive adhesive containing silver flakes. Finally, the resulting capacitor element was sheathed with a resin (epoxy resin) by molding with end portions of the lead frames out to obtain a solid electrolytic capacitor.

Comparative Example 1

A solid electrolytic capacitor was prepared in the same preparation method as in Example 1, except that the step of placing silica particles was omitted.

Solid electrolytic capacitors prepared in this manner were compared with solid electrolytic capacitors prepared in the same manner as in Example 1 with respect to proportion defective in LC in the preparation and proportion defective in LC after mounting.

The proportion defective in LC in the preparation means a proportion of capacitors which were rejected from lots for the reason of increased LCs thereof after 500 capacitors had been subjected to the step of sheathing with a resin. The proportion defective after mounting means a proportion of capacitors which were found to be impaired their functions as capacitors because of increased LCs thereof after 500 capacitors had been subjected to simulation of mounting where the capacitors had been put on a reflow oven and maintained twice at 260degreeC. for 10 seconds.

TABLE 1

| | proportion defective in LC in preparation (%) | proportion defective in LC after mounting (ppm) |
|---|---|---|
| Ex. 1 | 0.5 to 0.9 | less than 1 |
| Comp.Ex. 1 | 5 to 15 | 10 to 100 |

As is apparent from the results shown in Table 1, the proportion defective in LC in the preparation and the proportion defective in LC after mounting were remarkably lowered by placing the non-conductive particles in the interface between the dielectric layer and the electrolyte layer.

What is claimed is:

1. A solid electrolytic capacitor comprising:
   an anode body;
   a dielectric layer formed over the surface of the anode body;
   non-conductive particles placed on at least a part of the dielectric layer;
   an electrolyte layer formed on the dielectric layer with the non-conductive particles placed thereon, said electrolyte layer including an electrically conductive polymer and electrically conductive particles; and
   a cathode body formed on the electrolyte layer.

2. The solid electrolytic capacitor according to claim 1, wherein the non-conductive particles are present at least on surfaces of defective portions of the dielectric layer.

3. The solid electrolytic capacitor according to claim 2, wherein at least a part of the non-conductive particles are in contact with a part of the electrically conductive particles of the electrolyte layer.

4. The solid electrolytic capacitor according to claim 1, wherein the cathode body contains, as a member of its material, the same material as the electrically conductive particles.

5. A method for preparing a solid electrolytic capacitor, said method comprising steps of:
   (A) forming a dielectric layer over a surface of an anode body;
   (B) forming an electrolyte layer including electrically particles on the dielectric layer;
   (C) applying a colloidal dispersion containing non-conductive colloidal particles to the product resulting from the step (B), followed by drying the resultant to place the non-conductive particles in the interface between the dielectric layer and the electrolyte layer; and
   (D) forming a cathode body on the electrolyte layer.

6. The method for preparing a solid electrolytic capacitor according to claim 5, wherein the non-conductive particles have an average diameter smaller than that of the electrically conductive particles.

7. The method for preparing a solid electrolytic capacitor according to claim 5, wherein the cathode body contains, as a member of its material, the same material as the electrically conductive particles.

* * * * *